United States Patent
Chen et al.

(10) Patent No.: US 11,709,574 B2
(45) Date of Patent: Jul. 25, 2023

(54) ELECTRONIC DEVICE PROPERLY DISPLAYING WIDGETS IN BLANK REGION WHEN OPERATED BY ONE HAND

(71) Applicant: ASUSTeK COMPUTER INC., Taipei (TW)

(72) Inventors: Yun-Ju Chen, Taipei (TW); Yu-Chi Huang, Taipei (TW); Chen-Yu Hsu, Taipei (TW); Chih-Hsien Yang, Taipei (TW); I-Hsi Wu, Taipei (TW); Hsin-Yi Pu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/689,130

(22) Filed: Mar. 8, 2022

(65) Prior Publication Data
US 2022/0291786 A1    Sep. 15, 2022

(30) Foreign Application Priority Data

Mar. 15, 2021    (TW) .................................. 110109225

(51) Int. Cl.
*G06F 3/0481*    (2022.01)
*G06F 9/451*    (2018.01)

(52) U.S. Cl.
CPC ............ *G06F 3/0481* (2013.01); *G06F 9/451* (2018.02); *G06F 2203/04806* (2013.01)

(58) Field of Classification Search
CPC ...... G06F 3/041; G06F 3/0412; G06F 3/0414; G06F 3/042; G06F 3/044; G06F 3/045; G06F 3/046; G06F 3/047; G06F 3/048; G06F 9/451; G06F 2203/04806

USPC ................................................... 345/173–179
See application file for complete search history.

(56) References Cited

U.S. PATENT DOCUMENTS

| | | | |
|---|---|---|---|
| 2010/0013842 A1* | 1/2010 | Green | G06T 15/005 345/522 |
| 2014/0253538 A1* | 9/2014 | Bailiang | G06T 15/20 345/419 |
| 2014/0340304 A1* | 11/2014 | Dewan | G06T 17/05 345/156 |
| 2015/0033175 A1* | 1/2015 | Wu | G06F 3/0484 715/771 |
| 2015/0293671 A1* | 10/2015 | Miki | G06F 3/04817 345/173 |

(Continued)

FOREIGN PATENT DOCUMENTS

| | | |
|---|---|---|
| CN | 105094605 A | 11/2015 |
| CN | 105760055 A | 7/2016 |

(Continued)

*Primary Examiner* — Amit Chatly
*Assistant Examiner* — Nelson Lam
(74) *Attorney, Agent, or Firm* — McClure, Qualey & Rodack, LLP

(57) ABSTRACT

An electronic device includes a display and a processor. The processor is electrically coupled to the display. The processor is configured to execute a plurality of program instructions to perform the following steps: defining a window display region and an interface display region on the display when the electronic device is operated in a one-hand operation mode; displaying a desktop display interface corresponding to the one-hand operation mode in the interface display region; and displaying a plugin in the window display region.

8 Claims, 5 Drawing Sheets

(56) References Cited

U.S. PATENT DOCUMENTS

2016/0349856 A1* 12/2016 Chi ................... G06F 3/0238
2017/0024105 A1*  1/2017 Li .................... G06F 3/0488

FOREIGN PATENT DOCUMENTS

| CN | 110865764 A | 3/2020 |
| CN | 111124201 A | 5/2020 |
| TW | M486792 U | 9/2014 |

* cited by examiner

ELECTRONIC DEVICE PROPERLY DISPLAYING WIDGETS IN BLANK REGION WHEN OPERATED BY ONE HAND

CROSS-REFERENCE TO RELATED APPLICATION

This application claims the priority benefit of Taiwan application serial No. 110109225, filed on Mar. 15, 2021. The entirety of the above-mentioned patent application is hereby incorporated by reference herein and made a part of the specification.

BACKGROUND OF THE INVENTION

Field of the Invention

The disclosure relates to an electronic device.

Description of the Related Art

At present, a one-hand operation mode of a mobile device is to zoom out a main screen, so that fingers of a user can touch the zoomed-out main screen. However, such an operation causes some blank screen to be presented in a display region of the mobile device. In addition to making the user feel that the screen is not beautiful during a one-hand operation, the blank screen also causes waste in the use of the display screen.

BRIEF SUMMARY OF THE INVENTION

According to an aspect of the disclosure, an electronic device is provided. The electronic device includes a display and a processor. The processor is electrically coupled to the display. The processor is configured to execute a plurality of program instructions to perform the following steps: defining a window display region and an interface display region on the display when the electronic device is operated in a one-hand operation mode; displaying a desktop display interface corresponding to the one-hand operation mode in the interface display region; and displaying a plugin in the window display region.

BRIEF DESCRIPTION OF THE DRAWINGS

When the following detailed description is read with reference to the accompanying drawings, the aspect of the disclosure is better understood. It should be noted that, in accordance with the practical requirements of the description, each feature in the drawings is not necessarily drawn to scale. In fact, for the purpose of clarity, the size of the each feature is increased or decreased arbitrarily.

DETAILED DESCRIPTION OF THE EMBODIMENTS

Figure 1:
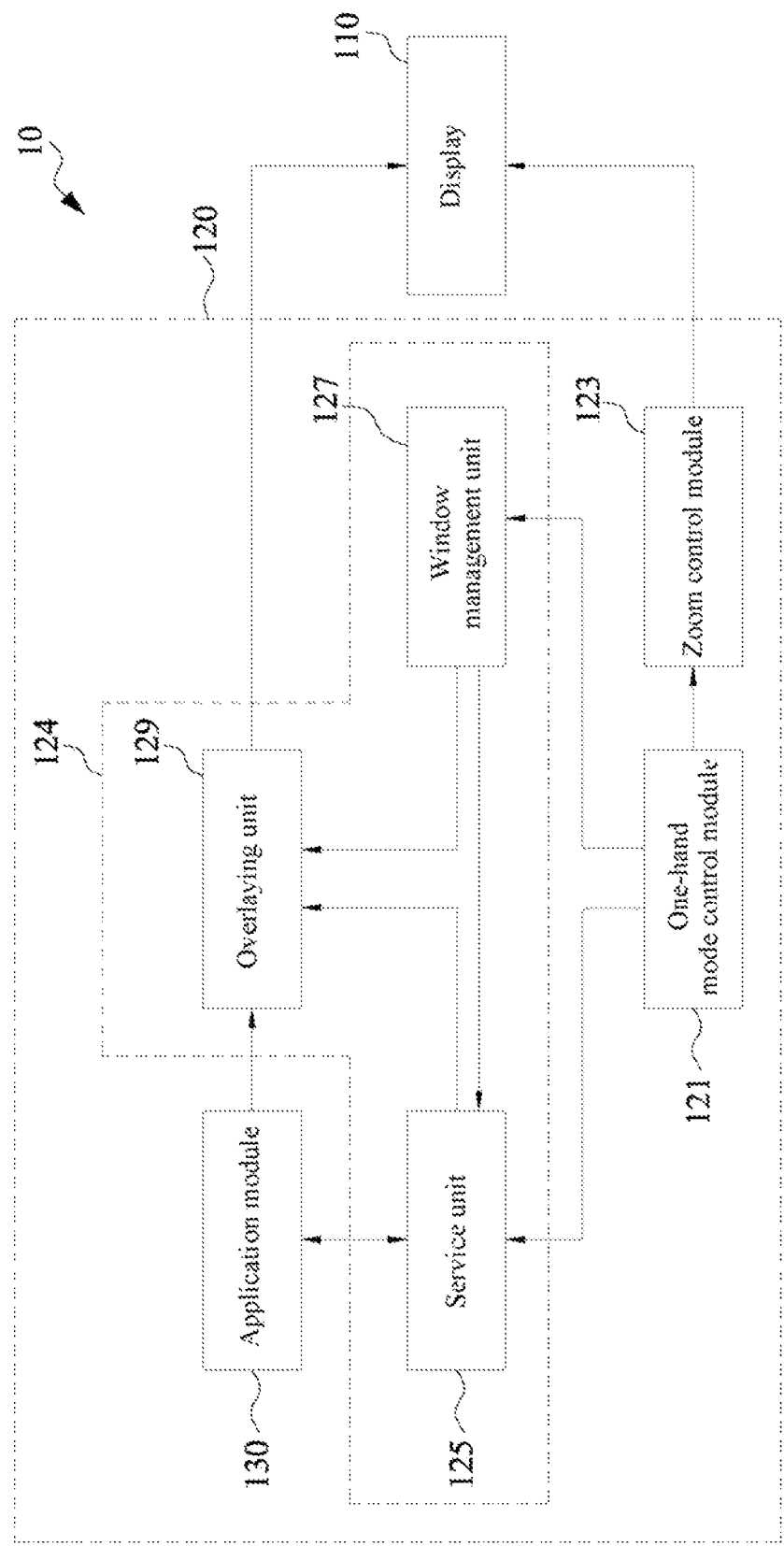
FIG. 1 is a block diagram of an electronic device according to some embodiments of the disclosure.

FIG. 1 is a block diagram of an electronic device 10 according to some embodiments of the disclosure. As shown in FIG. 1, the electronic device 10 includes a display 110 and a processor 120. The display 110 is electrically coupled to the processor 120. The processor 120 includes a one-hand mode control module 121, a zoom control module 123, a plugin generating module 124, and an application module 130. The one-hand mode control module 121 is coupled to the zoom control module 123 and the plugin generating module 124. The plugin generating module 124 is coupled to the application module 130 and the display 110.

In some embodiments, the plugin generating module 124 includes a service unit 125, a window management unit 127, and an overlaying unit 129. The one-hand mode control module 121 is coupled to the service unit 125 and the window management unit 127. The window management unit 127 is coupled to the service unit 125 and the overlaying unit 129. The service unit 125 is coupled to the overlaying unit 129 and the application module 130. The overlaying unit 129 is coupled to the display 110 and the application module 130. In some embodiments, the processor 120 is a system controller that integrates a processor, an operating system, and a related algorithm.

In some embodiments, the application module 130 is executed in the electronic device 10, and is, in an embodiment, a mobile application (APP) other than the operating system in the electronic device 10. The mobile App has a plugin form. In some embodiments, the plugin includes an App widget. In some embodiments, when the electronic device 10 is operated in a one-hand operation mode, the display 110 switches to a display form of the one-hand operation mode, so that the App widget is displayed in a blank region in the one-hand operation mode. In some embodiments, the APP is a weather forecast App, an App that generates a 2d barcode (such as a payment 2d barcode generated by a mobile payment App, a mobile phone barcode generated by an accounting App), a music player, or the like. Therefore, the App widget displayed in the blank region in the one-hand operation mode is a 2d barcode, a music player, or the like.

In some embodiments, the display 110 is implemented as a touchscreen such as a capacitive, infrared, resistive, or surface acoustic wave (SAW) device, and is any type of touchscreen currently known or developed in the future.

In some embodiments, the electronic device 10 is controlled on the display 110 through fingers to start the one-hand operation mode. In an embodiment, when the electronic device 10 is operated in the one-hand operation mode, a desktop display interface of the electronic device 10 is zoomed-out and displayed on the display 110, and a blank screen region is presented on a remaining part in which the desktop display interface is not displayed in the display 110. The blank screen region is by default a black region that does not display any pattern for not receiving any display data.

Figure 2:
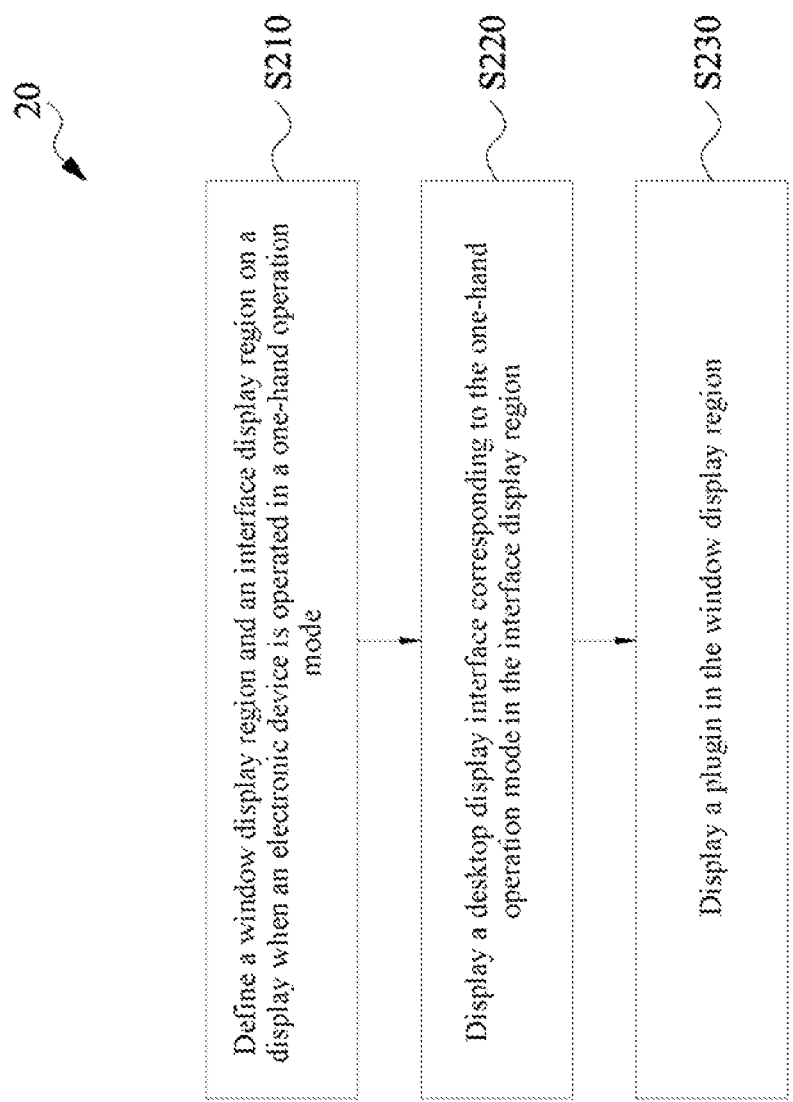
FIG. 2 is a flowchart of an electronic device operation method according to some embodiments of the disclosure.
Figure 3:
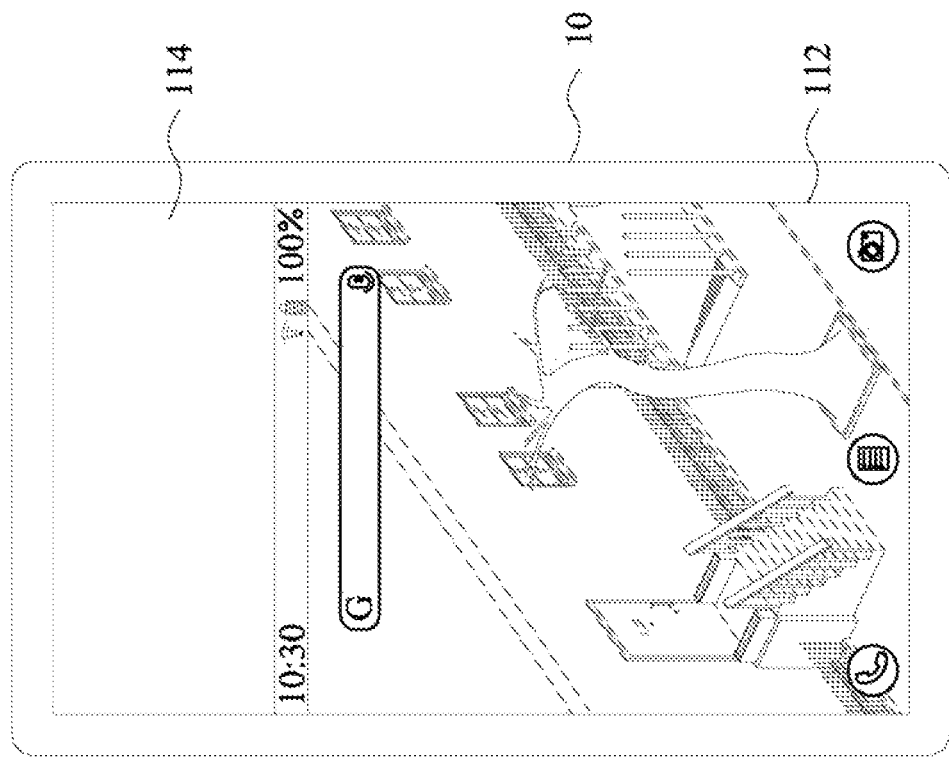
FIG. 3 is a flowchart of an electronic device operation method according to some embodiments of the disclosure.

To facilitate understanding of the disclosure, the following description is provided with reference to FIG. 1, FIG. 2, and FIG. 3 together. FIG. 2 is a flowchart of an operation method 20 according to some embodiments of the disclosure. The operation method 20 is performed by the electronic device 10 in FIG. 1. FIG. 3 is a schematic diagram of the display 110 when the electronic device 10 is operated in the one-hand operation mode.

In step S210, an interface display region 112 and a window display region 114 are defined on the display 110 when the electronic device 10 is operated in the one-hand operation mode.

As shown in FIG. 3, a display screen of the display 110 includes the interface display region 112 and the window display region 114. A desktop display interface that is moved or zoomed-out when the electronic device 10 is in a common operation mode is displayed in the interface display region 112.

In step S220, a desktop display interface corresponding to the one-hand operation mode is displayed in the interface display region 112.

In some embodiments, the desktop display interface is a main screen of the electronic device 10. In the one-hand operation mode, a screen displayed in the interface display region 112 is, in an embodiment, the desktop display interface that is moved or zoomed-out. In some embodiments, the window display region 114 is a region for displaying a plugin. Before the App widget is specified, as shown in FIG. 3, the window display region 114 is a blank display region in which no screen is displayed.

In step S230, a plugin is displayed in the window display region 114.

A plurality of applications is installed on the electronic device 10. In some embodiments, one App widget is displayed in the window display region 114 at a time. A user determines the App widget to be displayed in the window display region 114 through a selector (not shown in FIG. 1) of the electronic device 10. A method for selecting the App widget is described later.

Figure 4:
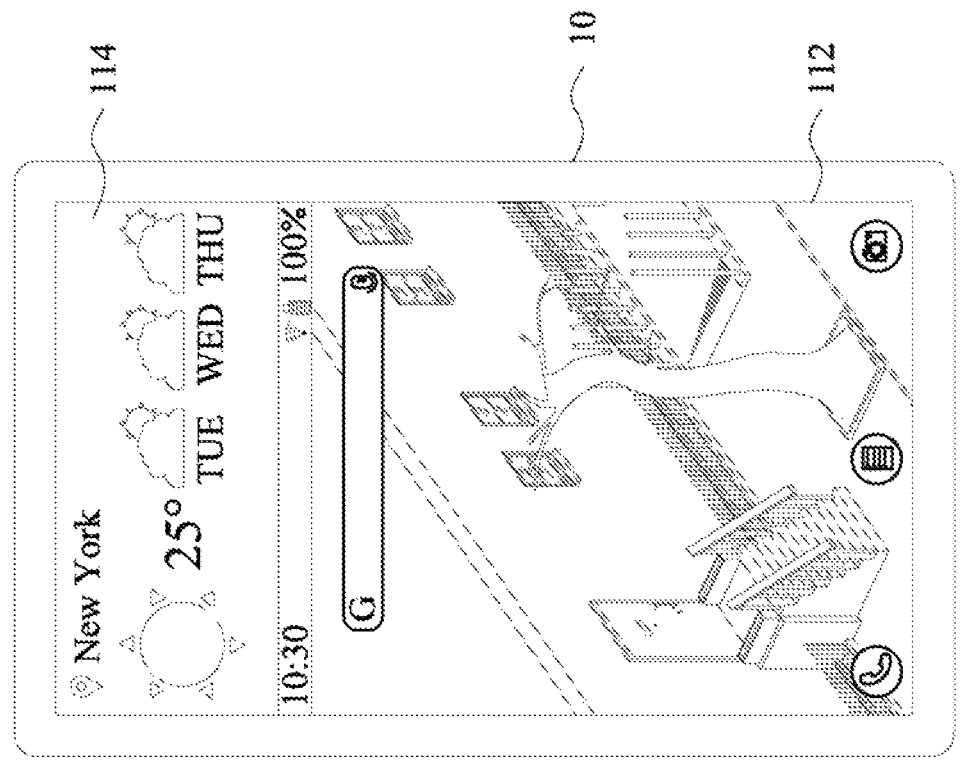
FIG. 4 is a schematic diagram of an electronic device operated in a one-hand operation mode according to some embodiments of the disclosure.

FIG. 4 is a schematic diagram of the display 110 when the electronic device 10 is operated in the one-hand operation mode. As shown in FIG. 4, when the electronic device 10 is in a common mode, the desktop display interface is zoomed-out or moved to the interface display region 112 because the electronic device 10 is operated in the one-hand operation mode. In an embodiment, the user watches the zoomed-out or moved main screen in the interface display region 112. Information such as a battery capacity, a network signal, and time of the electronic device 10 is displayed above a border of the interface display region 112. Meanwhile, the plugin is displayed in the window display region 114. Using FIG. 4 as an example, the user selects the App widget of weather forecast. Therefore, information about weather forecast is displayed in the window display region 114. The disclosure is not limited to the App widget displayed in the window display region 114.

Figure 5:
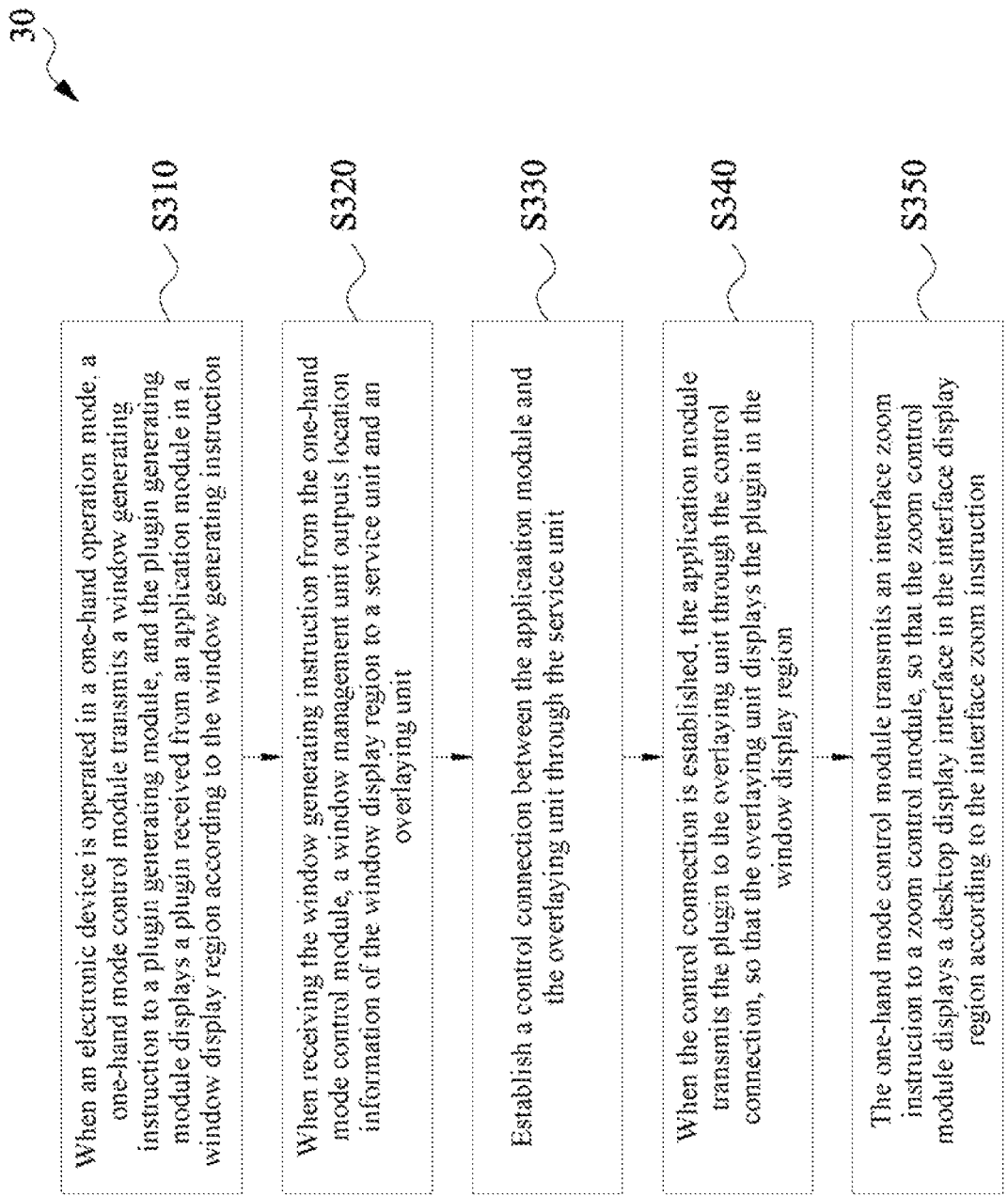
FIG. 5 is a flowchart of an electronic device operation method according to some embodiments of the disclosure.

FIG. 5 is a flowchart of an electronic device operation method 30 according to some embodiments of the disclosure. To facilitate description of the disclosure, the following description is provided with reference to FIG. 1 and FIG. 5 together.

In step S310, when the electronic device 10 is operated in the one-hand operation mode, the one-hand mode control module 121 transmits a window generating instruction to the plugin generating module 124, and the plugin generating module 124 displays the plugin received from the application module 130 in the window display region 114 according to the window generating instruction.

In some embodiments, the window generating instruction generated by the one-hand mode control module 121 is executed to generate the window display region 114, and the window display region 114 is associated with a location of the plugin displayed in the display 110.

In step S320, when the window management unit 127 receives the window generating instruction from the one-hand mode control module 121, the window management unit 127 outputs location information of the window display region 114 to the service unit 125 and the overlaying unit 129.

In some embodiments, the window management unit 127 generates the location information of the window display region 114 based on the window generating instruction, and the location information of the window display region 114 is used for a subsequent display procedure of the plugin.

In step S330, a control connection between the application module 130 and the overlaying unit 129 is established through the service unit 125.

In some embodiments, plugins are installed on the electronic device 10, and the plugins are additionally installed applications other than the operating system installed on the electronic device 10. Therefore, the application module 130 fails in directly transmitting data to the overlaying unit 129, but needs to establish the control connection, such as a remote view connection, to transmit data of the plugin to the overlaying unit 129.

In some embodiments, when the service unit 125 transmits the location information of the window display region 114 to the application module 130, the application module 130 transmits the control connection back to the service unit 125, and the service unit 125 transmits the control connection to the overlaying unit 129. Therefore, the control connection between the application module 130 and the overlaying unit 129 is established using the service unit 125 as a medium.

In step S340, when the control connection is established, the application module 130 transmits the plugin to the overlaying unit 129 through the control connection, so that the overlaying unit 129 displays the plugin in the window display region 114.

In some embodiments, the overlaying unit 129 receives the data of the plugin through the control connection, and displays the plugin in the window display region 114 according to the location information of the window display region 114.

A plurality of widgets is installed on the electronic device 10. The user selects a widget to be displayed in the window display region 114. In some embodiments, the processor 120 generates a binding widget instruction in the one-hand operation mode. The processor 120 executes the binding widget instruction to trigger the selector (not shown in FIG. 1) to determine the plugin to be displayed in the window display region 114 from the widgets. In an embodiment, the selector is a "setting" control option in the electronic device 10 and operated in a project in the one-hand operation mode. The selector includes an application list. The user selects an App widget to be presented in the window display region 114 from the application list.

In step S350, the one-hand mode control module 121 transmits an interface zoom instruction to the zoom control module 123, so that the zoom control module 123 displays the desktop display interface in the interface display region 112 according to the interface zoom instruction.

In some embodiments, the zoom control module 123 zooms out and/or moves the desktop display interface according to the interface zoom instruction. In an embodiment, the one-hand mode control module 121 transmits related control data (such as a zoomed range of the main screen) of the one-hand operation mode to the zoom control module 123. The zoom control module 123 displaces or zooms out a location of the main screen displayed in the display 110 according to the control data.

The electronic device 10 is implemented as, but not limited to, a portable electronic device, a mobile phone, a tablet computer, a personal digital assistant (PDA), or the like, and any electronic device that is suitable for one-hand and both-hand operations and that includes a touchscreen falls within the scope of the disclosure.

In some embodiments, the processor 120 is implemented as, but not limited to, a central processing unit (CPU), a system on chip (SoC), an application processor, an audio processor, a digital signal processor (DSP), or a processing chip or controller with a specific function.

In some embodiments, the electronic device 10 further includes a storage medium (not shown in FIG. 1). The storage medium is implemented as, but not limited to, a random access memory (RAM) or a non-volatile memory (such as a flash memory), a read-only Memory (ROM), a hard disk drive (MD), a solid state drive (SSD), an optical memory, or the like.

In some embodiments, the disclosure provides a non-transient computer-readable recording medium storing a plurality of program codes. After the program codes are loaded into the processor 120 shown in FIG. 1, the processor 120 executes the program codes and performs the steps shown in FIG. 2 and FIG. 5.

In conclusion, according to the electronic device and the electronic device operation method provided in the disclosure, when the electronic device is operated by one hand, because the main screen is zoomed out, some blank region in which no data is displayed is generated in the display screen, the blank region is properly used to display other widgets, instead of presenting a blank screen (such as a black screen in which no data is displayed). In addition, the user freely selects the App widget to be displayed in the blank region. The App widget is a simple and easy-to-use software component and is generally designed in a form of a graphical control element. In the one-hand operation mode, a touch range operated by the user with one hand is the interface display region 112 shown in FIG. 3 and FIG. 4, the window display region 114 is a range that is difficult to be controlled with one hand. Therefore, the window display region is suitable for displaying the App widget that is mainly used to provide display information. With this design, the blank region of the electronic device is properly used, and a frequently-used App widget is set to be displayed in the window display region, which enhances the functionality of the one-hand operation mode. There is no need to switch back to the common mode to watch a specific widget or information about an application, which increases the convenience in use.

The foregoing content summarizes the features of several embodiments, so that a person skilled in the art can better understand the aspect of the disclosure. A person skilled in the art should note that the foregoing content is used fairly easily as a basis to design or modify other changes, to implement the same purpose as the embodiments described in the specification and/or implement the same advantage. The foregoing content should be understood as an example of the disclosure, and the protection scope shall fall into the scope of the claims.

What is claimed is:

1. An electronic device, comprising:
    a display; and
    a processor, electrically coupled to the display, wherein the processor is configured to execute a plurality of program instructions to perform a sequence of steps:
        defining a window display region and an interface display region on the display when the electronic device is operated in a one-hand operation mode;
        displaying a desktop display interface corresponding to the one-hand operation mode in the interface display region; and
        displaying a plugin in the window display region,
    wherein the processor comprises:
        a one-hand mode control circuit, when the electronic device is operated in the one-hand operation mode, the one-hand mode control circuit is configured to transmit a window generating instruction; and
        a plugin generating circuit, coupled to the one-hand mode control circuit and at least one application circuit, when the electronic device is operated in the one-hand operation mode, the plugin generating circuit is configured to display the plugin received from the application circuit in the window display region according to the window generating instruction transmitted from the one-hand mode control circuit,
    wherein the plugin generating circuit further comprises:
        a window management circuit, configured to output a location information of the window display region when receiving the window generating instruction from the one-hand mode control circuit;
        a service circuit, coupled to the window management circuit, and configured to receive the location information of the window display region; and
        an overlaying circuit, coupled to the window management circuit and the service circuit, and configured to receive the location information of the window display region.

2. The electronic device according to claim 1, wherein the service circuit is coupled to the application circuit, and the service circuit is configured to establish a control connection between the application circuit and the overlaying circuit.

3. The electronic device according to claim 2, wherein when the control connection is established, the application circuit transmits the plugin to the overlaying circuit through the control connection, and the overlaying circuit displays the plugin in the window display region.

4. The electronic device according to claim 3, wherein the step of establishing the control connection by the service circuit comprises:
    transmitting the control connection back to the service circuit by the application circuit; and
    transmitting the control connection to the overlaying circuit by the service circuit when the service circuit transmits the location information of the window display region to the application circuit.

5. The electronic device according to claim 1,
    wherein the processor further comprises a zoom control circuit, the one-hand mode control circuit is coupled to the zoom control circuit, and
    when the electronic device is operated in the one-hand operation mode, the one-hand mode control circuit transmits an interface zoom instruction to the zoom control circuit, and the zoom control circuit displays the desktop display interface in the interface display region according to the interface zoom instruction.

6. The electronic device according to claim 5, wherein the zoom control circuit zooms out and/or moves the desktop display interface according to the interface zoom instruction.

7. The electronic device according to claim 1, wherein a plurality of widgets is installed on the electronic device, and the processor is further configured to generate a binding widget instruction in the one-hand operation mode.

8. The electronic device according to claim 7, wherein the processor is further configured to execute the binding widget instruction to determine the plugin to be displayed in the window display region from the plurality of widgets.

* * * * *